United States Patent
Kubota

(10) Patent No.: US 8,503,008 B2
(45) Date of Patent: Aug. 6, 2013

(54) COMPUTER READABLE MEDIUM, PRINTING CONTROL APPARATUS AND PRINTING SYSTEM FOR OUTPUTTING SECOND JOB AND FIRST JOB BASED ON SECOND JOB ATTRIBUTES

(75) Inventor: Masako Kubota, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1177 days.

(21) Appl. No.: 12/167,385

(22) Filed: Jul. 3, 2008

(65) Prior Publication Data
US 2009/0147300 A1 Jun. 11, 2009

(30) Foreign Application Priority Data
Dec. 6, 2007 (JP) ................................. 2007-315413

(51) Int. Cl.
*G06F 3/12* (2006.01)
(52) U.S. Cl.
USPC ........................... 358/1.15; 358/1.9; 358/1.16
(58) Field of Classification Search
USPC .................................................. 358/1.1–3.23
See application file for complete search history.

(56) References Cited

U.S. PATENT DOCUMENTS

| 7,684,064 B2 * | 3/2010 | Kimura et al. ............... 358/1.14 |
| 2003/0011812 A1 * | 1/2003 | Sesek et al. .................. 358/1.15 |
| 2006/0164680 A1 * | 7/2006 | Kim ............................. 358/1.15 |
| 2006/0279785 A1 * | 12/2006 | Onishi et al. ................. 358/1.18 |
| 2007/0044101 A1 * | 2/2007 | Suzuki et al. ................. 718/102 |

FOREIGN PATENT DOCUMENTS

| JP | 07-121328 A | 5/1995 |
| JP | 2001-078018 A | 3/2001 |
| JP | 2002-62995 A | 2/2002 |
| JP | 2004-284281 A | 10/2004 |
| JP | 2007-249637 A | 9/2007 |

OTHER PUBLICATIONS

Japanese Office Action dated Jan. 26, 2010 in Japanese Application No. 2007-315413.

* cited by examiner

*Primary Examiner* — Benny Q Tieu
*Assistant Examiner* — Marcellus Augustin
(74) *Attorney, Agent, or Firm* — Sughrue Mion, PLLC

(57) ABSTRACT

An computer readable medium storing a program causing a computer to execute a process for controlling printing, the process includes: accepting a first printing instruction; accepting a second printing instruction; storing, when the first printing instruction is accepted, a first print job corresponding to the first printing instruction in a storage unit; and outputting, to a printing apparatus, when the second printing instruction is accepted, both (i) a second print job corresponding to the second printing instruction and (ii) the first print job stored in the storage unit.

15 Claims, 10 Drawing Sheets

(FIRST EXEMPLARY EMBODIMENT)

(FIRST EXEMPLARY EMBODIMENT)

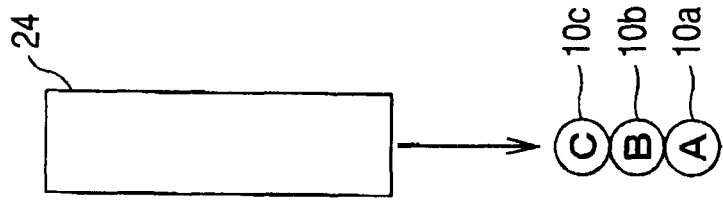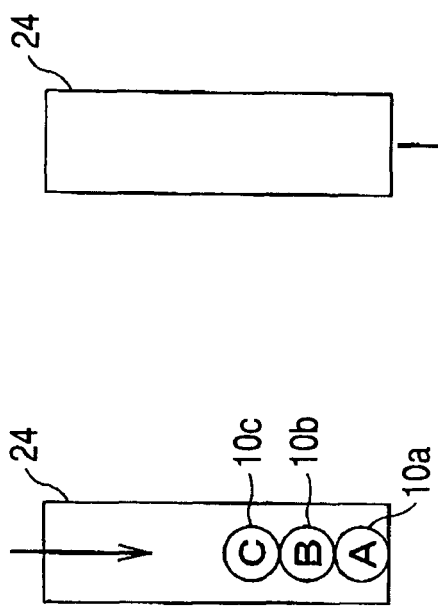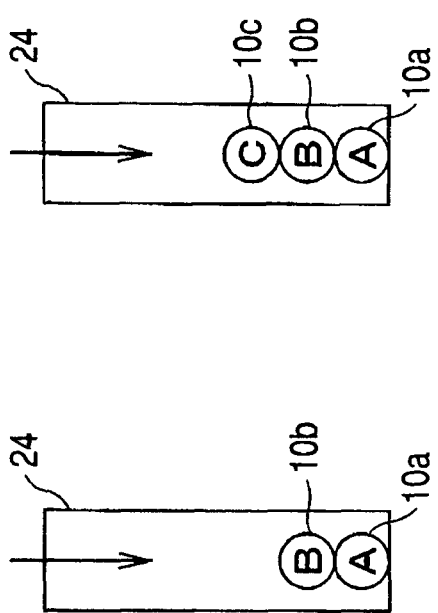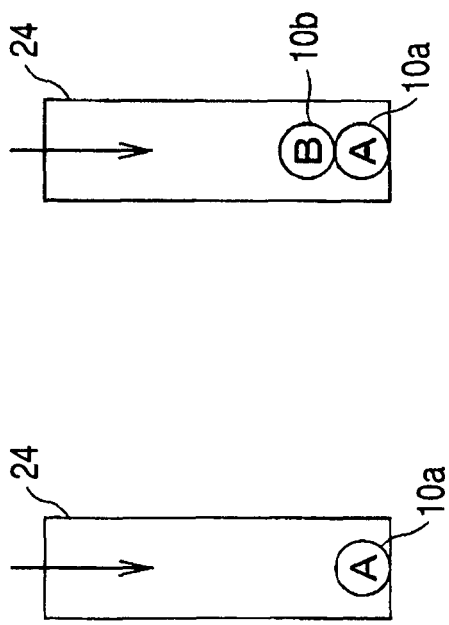
(FIRST EXEMPLARY EMBODIMENT)

(FIRST EXEMPLARY EMBODIMENT)

(SECOND EXEMPLARY EMBODIMENT)

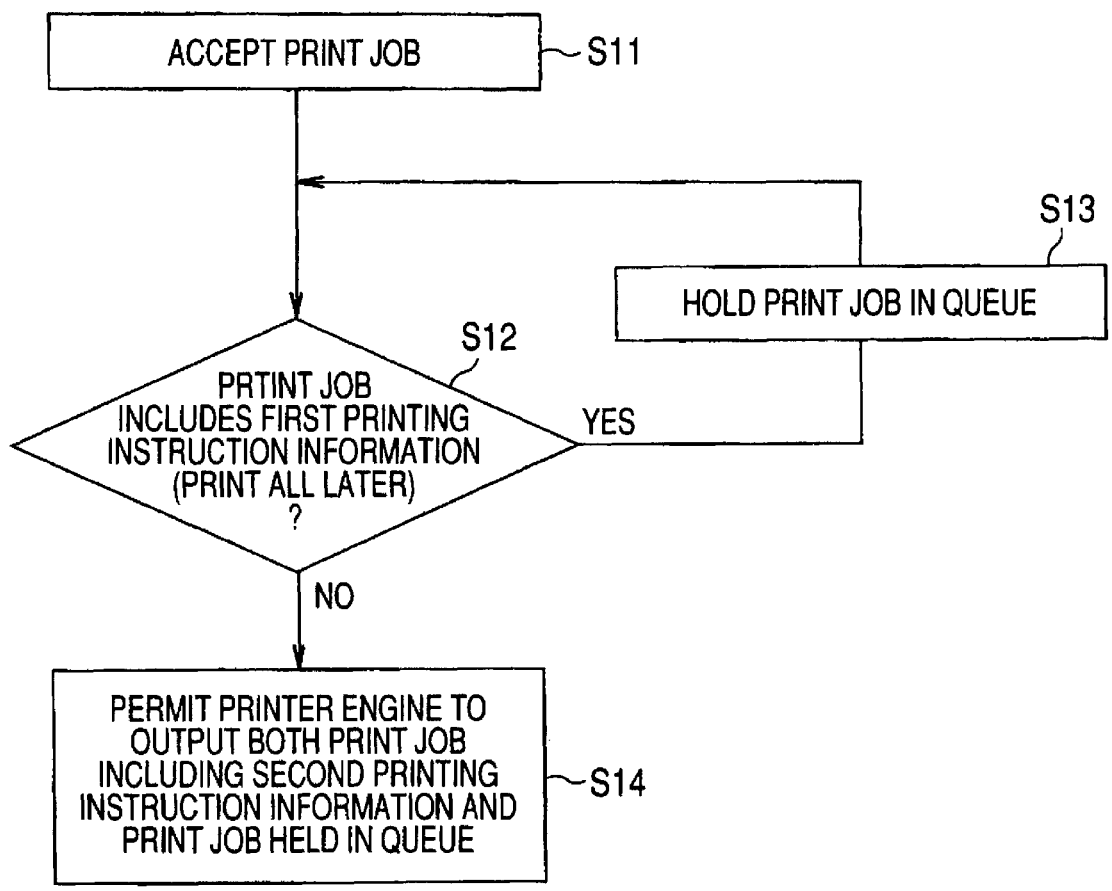

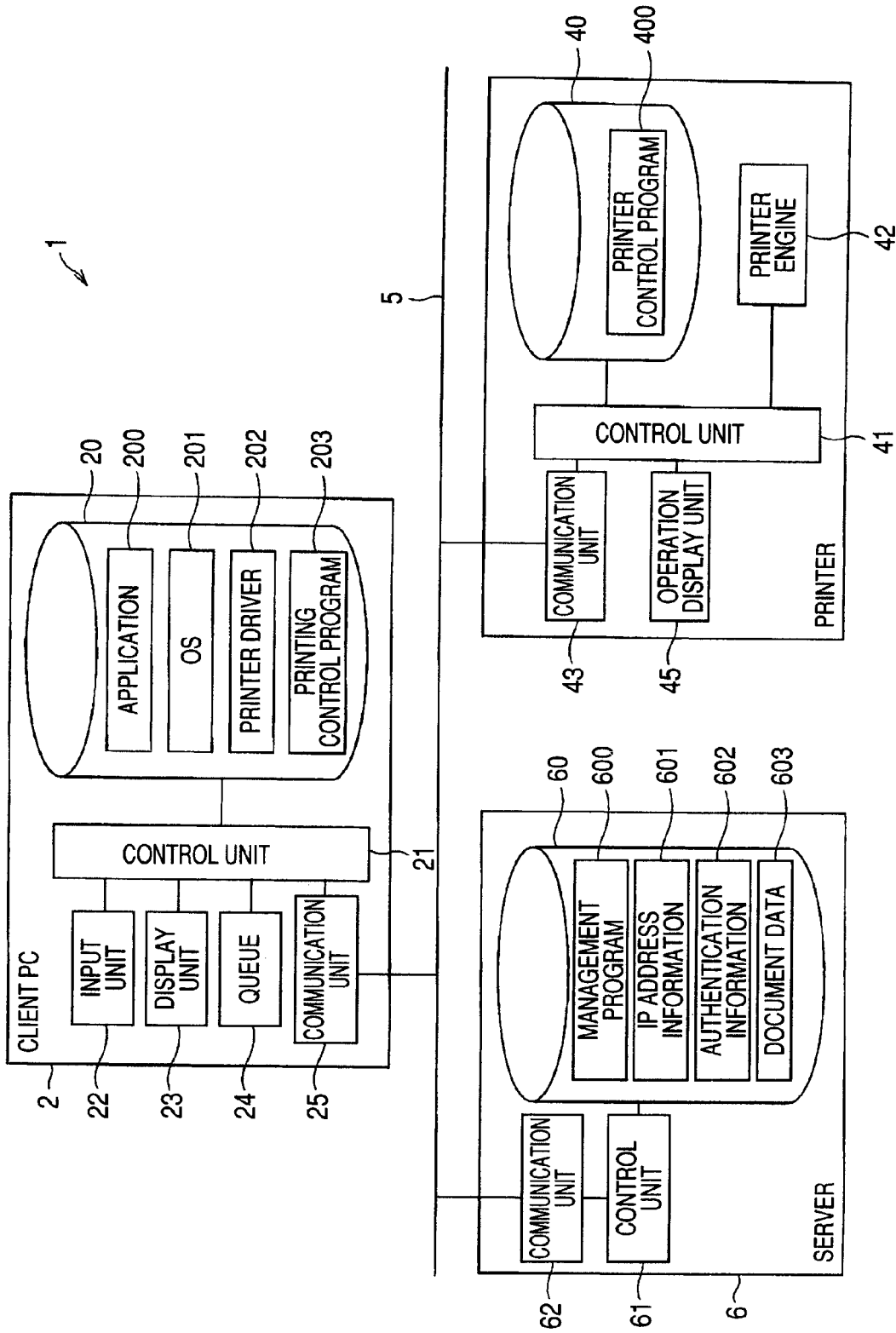
FIG. 7 (THIRD EXEMPLARY EMBODIMENT)

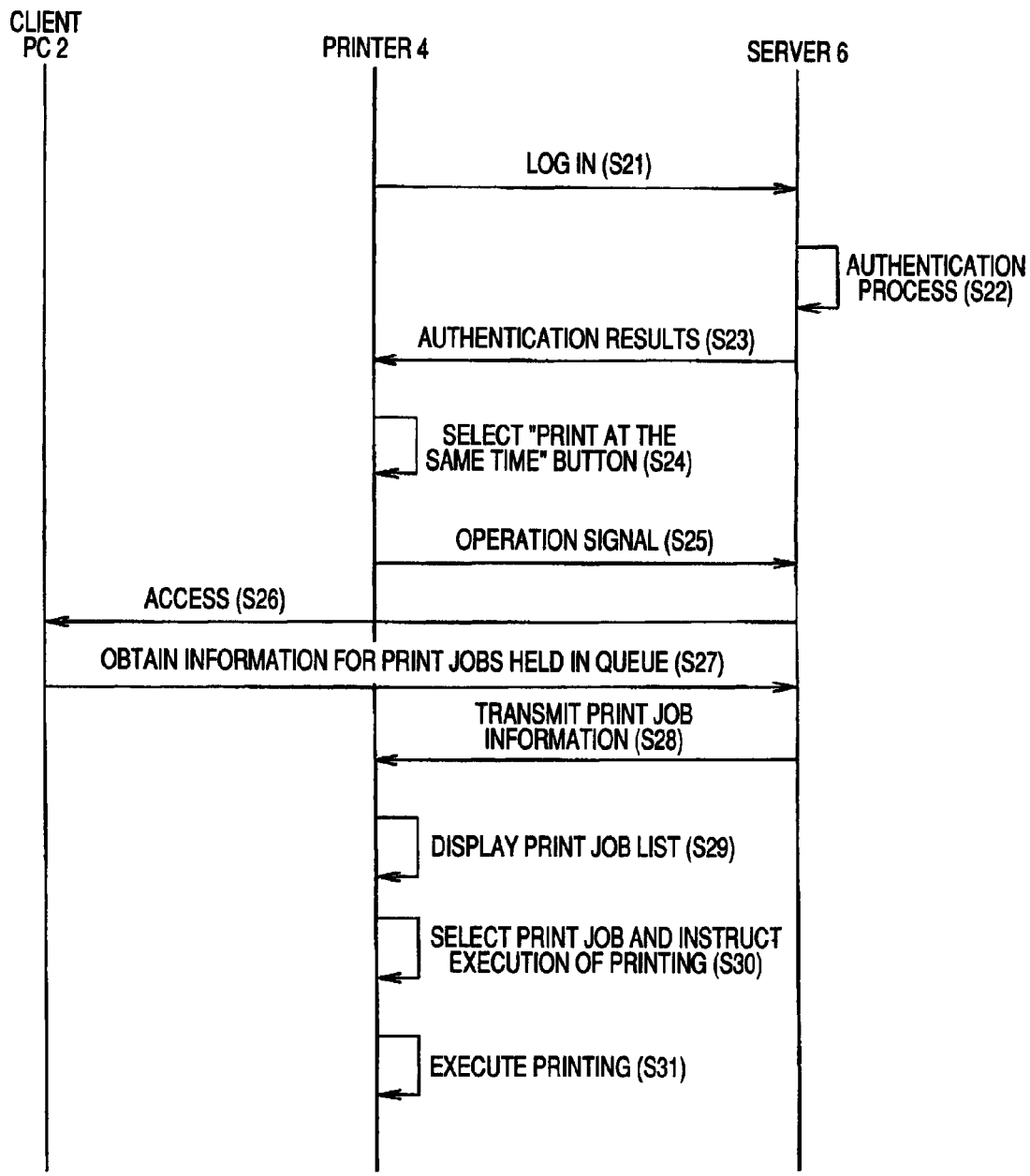

FIG. 9A
(FOURTH EXEMPLARY EMBODIMENT)
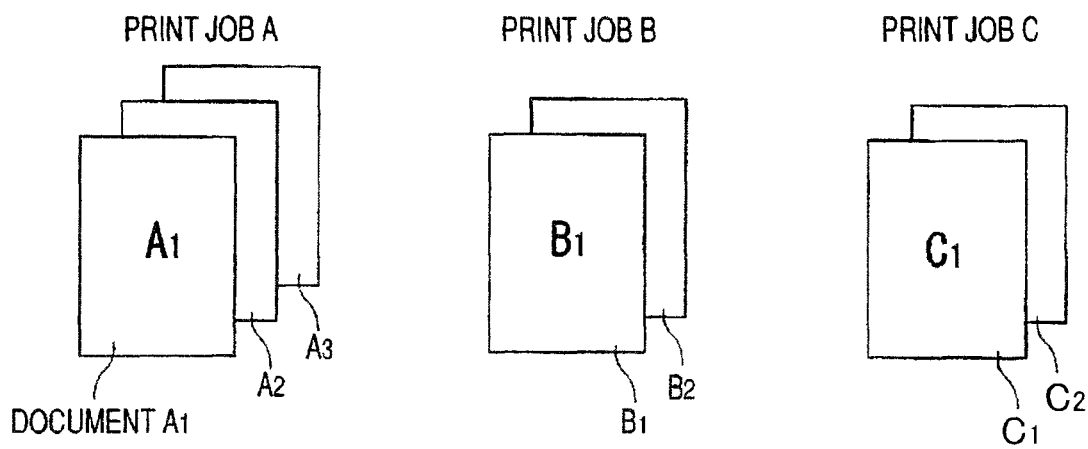
FIG. 9B
OBVERSE OF FIRST SHEET
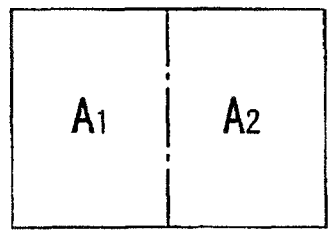
REVERSE OF FIRST SHEET
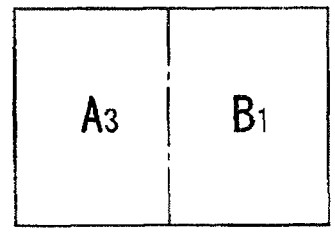
OBVERSE OF SECOND SHEET
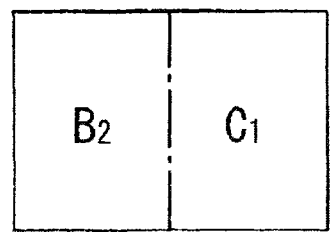
REVERSE OF SECOND SHEET
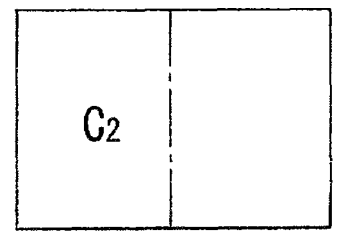

(FIFTH EXEMPLARY EMBODIMENT)

(SIXTH EXEMPLARY EMBODIMENT)

COMPUTER READABLE MEDIUM, PRINTING CONTROL APPARATUS AND PRINTING SYSTEM FOR OUTPUTTING SECOND JOB AND FIRST JOB BASED ON SECOND JOB ATTRIBUTES

CROSS-REFERENCE TO RELATED APPLICATIONS

This application is based on and claims priority under 35 USC 119 from Japanese Patent Application No. 2007-315413 filed Dec. 6, 2007.

BACKGROUND

1. Technical Field

The present invention relates to a computer readable medium, a printing control apparatus and a printing system.

2. Related Art

A system has been provided with a single printer and client terminal apparatuses. The single printer is connected to the client terminal apparatuses in the network, thereby shared by the clients.

SUMMARY

According to an aspect of the invention, an computer readable medium storing a program causing a computer to execute a process for controlling printing, the process includes: accepting a first printing instruction; accepting a second printing instruction; storing, when the first printing instruction is accepted, a first print job corresponding to the first printing instruction in a storage unit; and outputting, to a printing apparatus, when the second printing instruction is accepted, both (i) a second print job corresponding to the second printing instruction and (ii) the first print job stored in the storage unit.

BRIEF DESCRIPTION OF THE DRAWINGS

Exemplary embodiment(s) of the present invention will be described in detail based on the following figures, wherein:

FIGS. 3A, 3B, 3C and 3D are diagrams showing an example operation for adding a print job to a queue;

FIG. 6 is a flowchart showing the operation of a CPU based on a printing control program according to the second exemplary embodiment of the invention;

FIG. 7 is a block diagram illustrating an example printing system configuration according to a third exemplary embodiment of the present invention;

FIG. 8 is a flowchart showing the operation of a CPU based on a printing control program according to the third exemplary embodiment of the invention;

FIGS. 9A and 9B are diagrams showing an example print job and example printing results, respectively, according to a fourth exemplary embodiment of the present invention;

DETAILED DESCRIPTION

First Exemplary Embodiment

Figure 1:
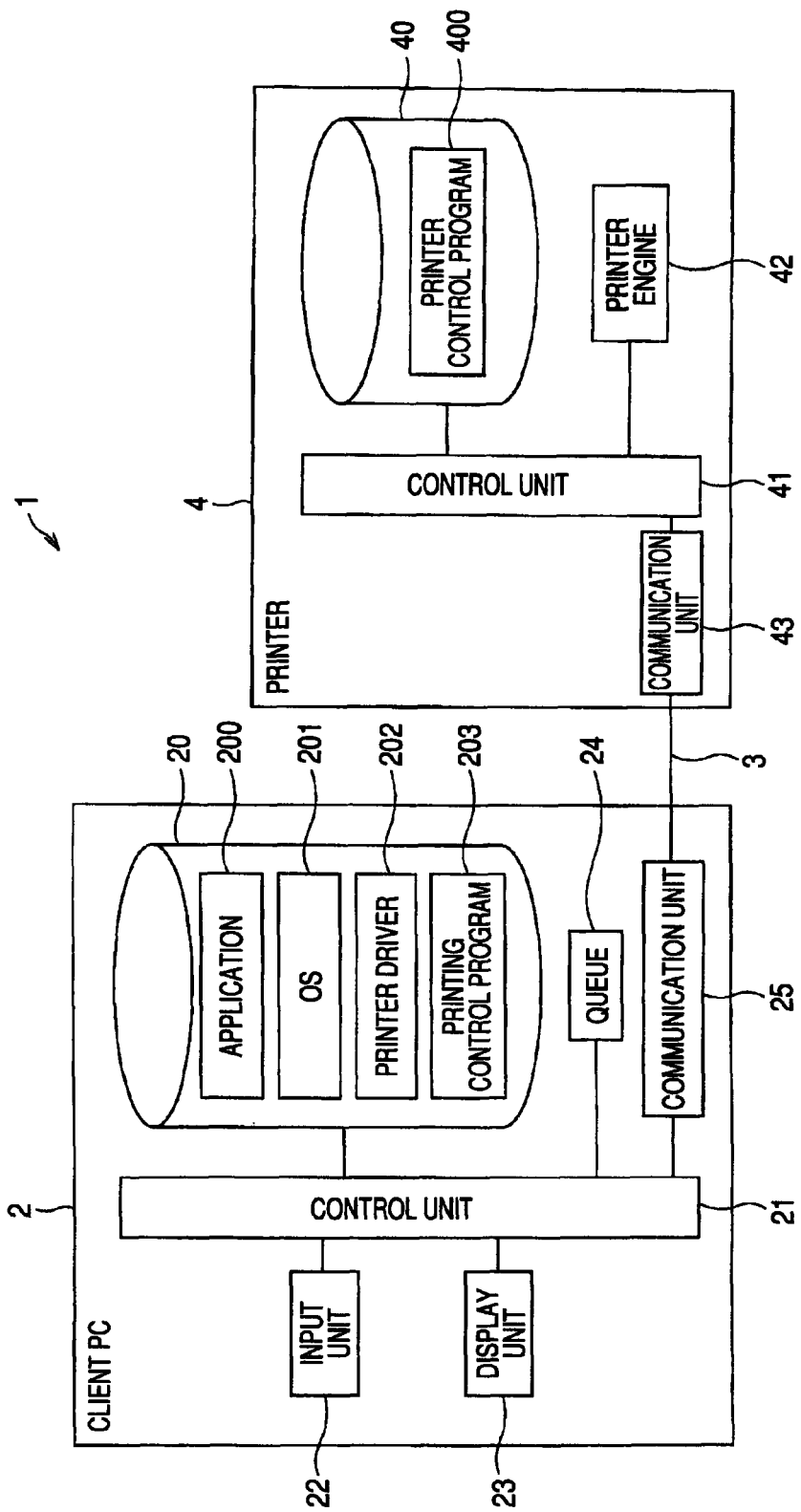
FIG. 1 is a block diagram illustrating an example printing system configuration according to a first exemplary embodiment of the present invention.

FIG. 1 is a block diagram illustrating an example configuration for a printing system according to a first exemplary embodiment of the present invention.

A printing system 1 includes: a client PC (Personal Computer) 2 that serves as a printing control apparatus; and a printer 4 that serves as printing unit and is connected to the client PC 2 via a transmission medium 3.

As the transmission medium 3, a wire medium, such as an electric cable or an optical cable, or a wireless medium, such as infrared or radio, can be employed.

(Client PC)

The client PC 2 includes: a storage unit 20 constituted, for example, by a ROM and an HDD (hard disk drive); a control unit 21 constituted by, for example, a CPU and a RAM; an input unit 22 that includes a keyboard and a mouse; a display unit 23, such as a liquid crystal display unit; a queue 24, for holding print jobs; and a communication unit 25 connected to the transmission medium 3. The input unit 22 and the display unit 23 may be provided using a touch panel display unit. Further, instead of the client PC 2, a cellular phone or a PDA (portable information terminal), for example, may be employed.

A "print job" includes a print target such as print data or document data to be printed, a printing condition (printing style) governing a condition when printing out the print target on paper, and printing instruction information (also called attribute information) corresponding to the print job or to the print target. The storage location information for the print target may be employed as the print target included in the print job. "Print data" represents data obtained by converting document data, so that the printer can translate the data. The document data may also include photographs and figures.

"Printing instruction information" indicates: information (first printing instruction information) for causing a print job to be held (awaiting turn) in a queue (or in a spooler or in memory) until an output instruction is issued, regardless of whether the printer is busy or not; and information (second printing instruction information) for sequentially outputting print jobs, beginning with the oldest, held in a queue (or in a spooler or in memory) to a printer, so long as the printer is not busy. In this exemplary embodiment, when a "print all later" button, which will be described later, is clicked on (selected) on a setup screen, such as a printing setup screen, the first printing instruction information is set up, and when the "print all later" button is not clicked on, the second print instruction information is set up. The second printing instruction information may be set up when predetermined button manipulation is performed, and the first printing instruction information may be set up when the predetermined button manipulation is not performed. Furthermore, to set up the printing instruction information, an icon or a menu may be manipulated, instead of the button.

Programs, such as an application 200, an operating system (OS) 201, a printer driver 202 and a printing control program 203, are stored in the storage unit 20.

The CPU of the control unit 21 reads a program from the storage unit 20 into the RAM and executes the program, to provide the program function.

The application 200 is, for example, a document processing program, a graphics program or a spreadsheet program, and when in use, creates documents by responding to commands entered by the user. When a printing instruction is issued for a document that has been created, the application 200 transmits document data to the printer driver 202. The document data that is prepared may be stored in the storage unit 20, the document data may be read from the storage unit 20 when printing or editing the document data, and then may be printed after editing the document data.

The printer driver 202 converts document data into print data the printer 4 can translate, and generates a print job that includes print data, a printing condition and printing instruction information.

The printing control program 203 determines whether attribute information included in a print job is either first printing instruction information or second printing instruction information. When the attribute information is first printing instruction information, the printing control program 203 adds the print job to the queue 24, where the print job is held (awaiting turn) until an output instruction is issued. When the attribute information is second printing instruction information, the printing control 203 adds the print job to the queue 24, and permits the communication unit 25 to output this print job, along with a print job previously added to the queue 24, to the printer 4, via the transmission medium 3.

(Printer)

The printer 4 includes: a storage unit 40 constituted, for example, by a ROM and an HDD (hard disk drive); a control unit 41 constituted, for example, by a CPU and a RAM; a printer engine 42 that uses print data, received from the client PC 2, and prints, in conformance with a printing condition designated by a user, a recording material such as a sheet of paper or an OHP transparency film sheet; and a communication unit 43, connected to the transmission medium 3. The printer 4 may be a multifunctional apparatus having additional capabilities, other than a printing function, such as facsimile telecommunication transmission and reception of graphic matter and digital image scanning.

Various reproductive engine types, such as an electrophotographic type, an inkjet type and a thermosensitive transfer type, may be employed as the printer engine 42.

Programs, including a printer control program 400, are stored in the storage unit 40.

The CPU of the control unit 41 reads a program from the storage unit 40 to a RAM, and then executes the program to provide the program function. In accordance with the printer control program 400, the CPU of the control unit 41 permits the printer engine 42 to translate and convert print data into bit mapped data, and to print the bit mapped data on a recording material.

Operation for the First Exemplary Embodiment

Figure 4:
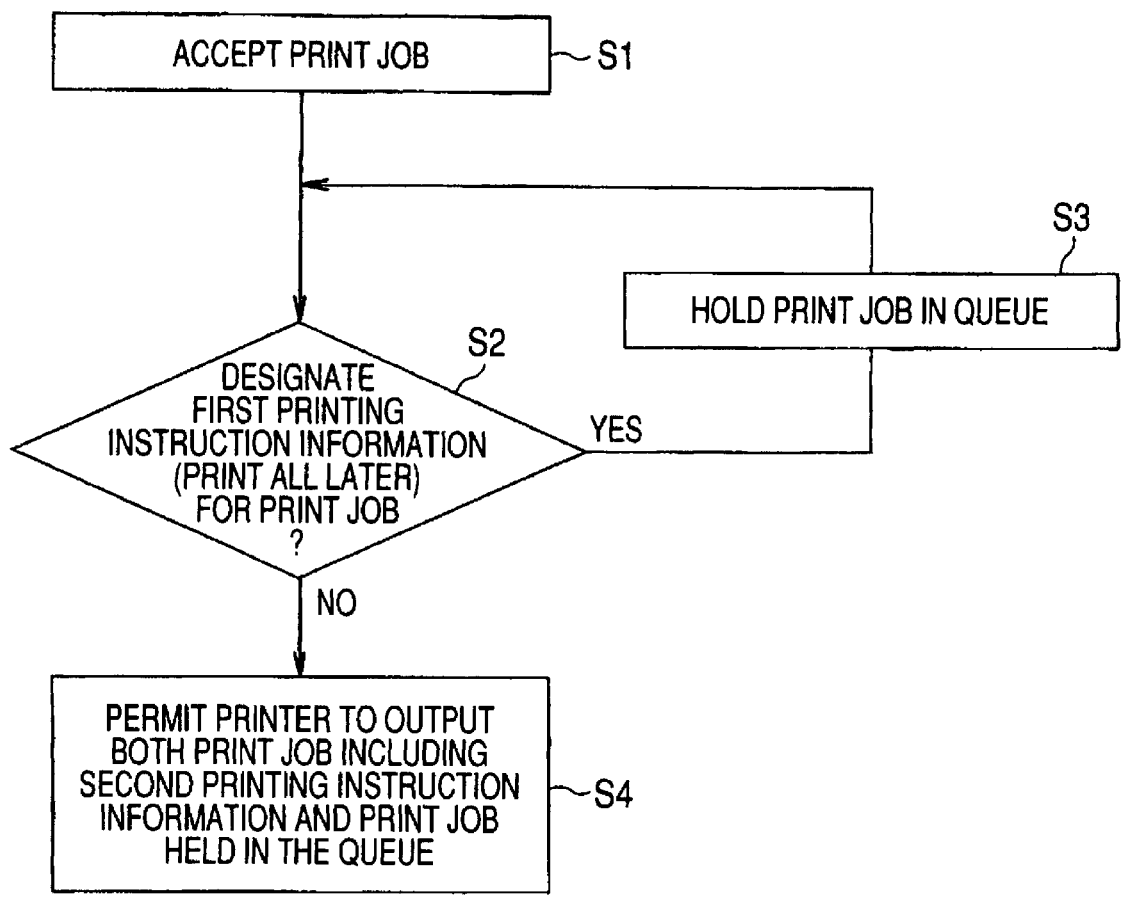
FIG. 4 is a flowchart showing the operation of a CPU based on a printing control program according to the first exemplary embodiment of the invention.

An example operation performed by the printing system 1 of the first exemplary embodiment will now be described while referring to FIGS. 2 to 4. For this example, an operation for sequentially generating a print job A, a print job B and a print job C is employed.

Assume that, a user creates a document using the application 200 by manipulating the input unit 22 of the client PC 2, and enters an instruction to print the document. Then, the application 200 transmits document data to the printer driver 202 via the OS 201, and the printer driver 202 displays a print setup screen on the display unit 23.

Figure 2:
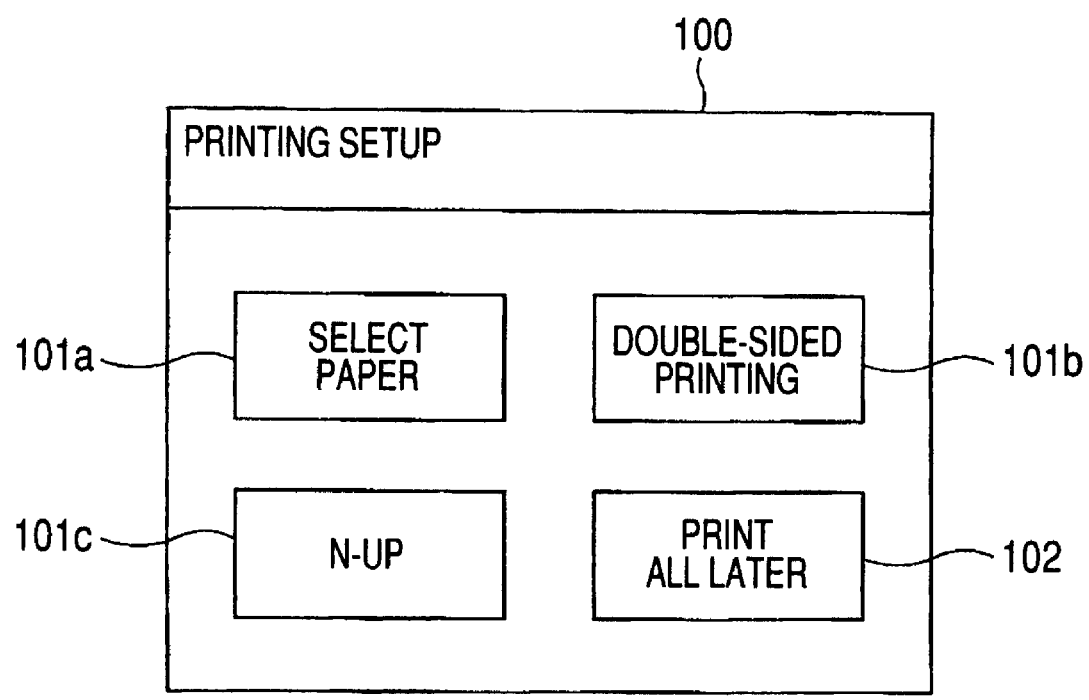
FIG. 2 is a diagram showing an example printing setup screen.

FIG. 2 is a diagram illustrating an example print setup screen. A print setup screen 100 includes: a "sheet select" entry 101a, for designating a sheet size such as A4, B4 or B5; a "double-sided printing" entry 101b, for printing on both the obverse and the reverse of a sheet; an "N-UP" entry 101c, for printing a plurality (N) of sets of print data on a single sheet; and a "print all later" button 102, for instructing the later printing of all the data. Entries made here may include ones for stapling, punching or folding a finished printed product.

The user then selects an entry or entries, from among the setup entries 101a to 101c presented on the print setup screen 100, and a printing condition. In this exemplary embodiment, assume that, as the printing condition, "print all later" is selected using the button 102.

FIGS. 3A to 3D are diagrams showing an example operation for adding a print job to a queue. FIG. 4 is a flowchart showing the operation of the CPU of the control unit 21, based on the printing control program 203. After a user has designated a printing condition, the printer driver 202 converts document data into print data that the printer 4 can translate, and generates, as first printing instruction information, a print job A (a first print job) that includes the print data, the printing condition and attribute information. Thereafter, the print job A is transmitted to the printing control program 203 (S1).

Based on the attribute information included in the print job A, the printing control program 203 determines whether the first printing instruction information ("print all later") has been selected for the print job A or not (S2). When the first printing instruction information has been designated (Yes at S2), the print job A (10a) is added, as shown in FIG. 3A, to the queue 24 and is held until an output instruction is issued (S3).

Sequentially, thereafter, assume that the user has issued a printing instruction for a document prepared in the same manner as described above and has determined a printing condition by selecting a desired setup entry or entries 101a to 101c which are presented on the printing setup screen 100 and selects the printing condition, "print all later", in this instance, using button 102. In this case, as shown in FIG. 3B, a thus generated print job B (10b) is added to the queue 24, and is held in the queue 24 until an output instruction is issued.

Following this, assume that the user has once more created a document, has issued printing instruction information, by selecting a desired entry or entries 101a to 101c presented on the printing setup screen 100, and selected a printing condition for the document, but did not select "print all later", using the button 102. In this case, the printer driver 202 designates the second printing instruction information as attribute information for a print job C (a second print job), and transmits this information to the printing control program 203. Since the attribute information for the print job C is the second printing instruction information (No at S2), as shown in FIG. 3C, the printing control program 203 temporarily adds the print job C (10c) to the queue 24, and as shown in FIG. 3D, permits the communication unit 25 to output, via the transmission medium 3, the print job A (10a) and then the print job B (10b), which were previously added to the queue 24, and then the print job C (10c) to the printer 4 that serves as printing unit (S4).

Thereafter, the printer 4 sequentially performs the print jobs A, B and C, which were output by the client PC 2. That is, based on the printer control program 400, the control unit 41 translates print data included in the print jobs A, B and C, and converts the print data into bit map data. Under controlling by the control unit 41, the printer engine 42, in conformance with designated job printing conditions, prints the bit map data for the print jobs A, B and C to recording materials.

In this exemplary embodiment, all of the first print jobs held in the queue 24 are output to the printer 4 with the second print job. However, one or more print jobs of the first print jobs held in the queue 24 to be performed may be selected by a user. Further, although the print job output order, A to B to C, has been employed, a user may change this order. In addition, the print job C corresponding to the second printing instruction information is output first, thereafter the other print jobs may be output in the order job A then B, or job B then A. Moreover, in this exemplary embodiment, print jobs corresponding to the first and the second printing instruction information have been held in the queue 24. However, a print job corresponding to the first printing instruction information may be held in the queue 24, and a print job corresponding to the second printing instruction information may not be held in the queue 24. In addition, a first queue, for holding a print job corresponding to the first printing instruction information, and a second queue, for holding a print job corresponding to the second printing instruction information, may be provided. Furthermore, when one of the second print jobs corresponding to respective pieces of the second printing instruction information specifies as a output destination the same printing apparatus as one of the first print jobs corresponding to respective pieces of the first printing instruction, the one of the second print jobs may be output to the output destination along with the one of the first print jobs.

Second Exemplary Embodiment

Figure 5:
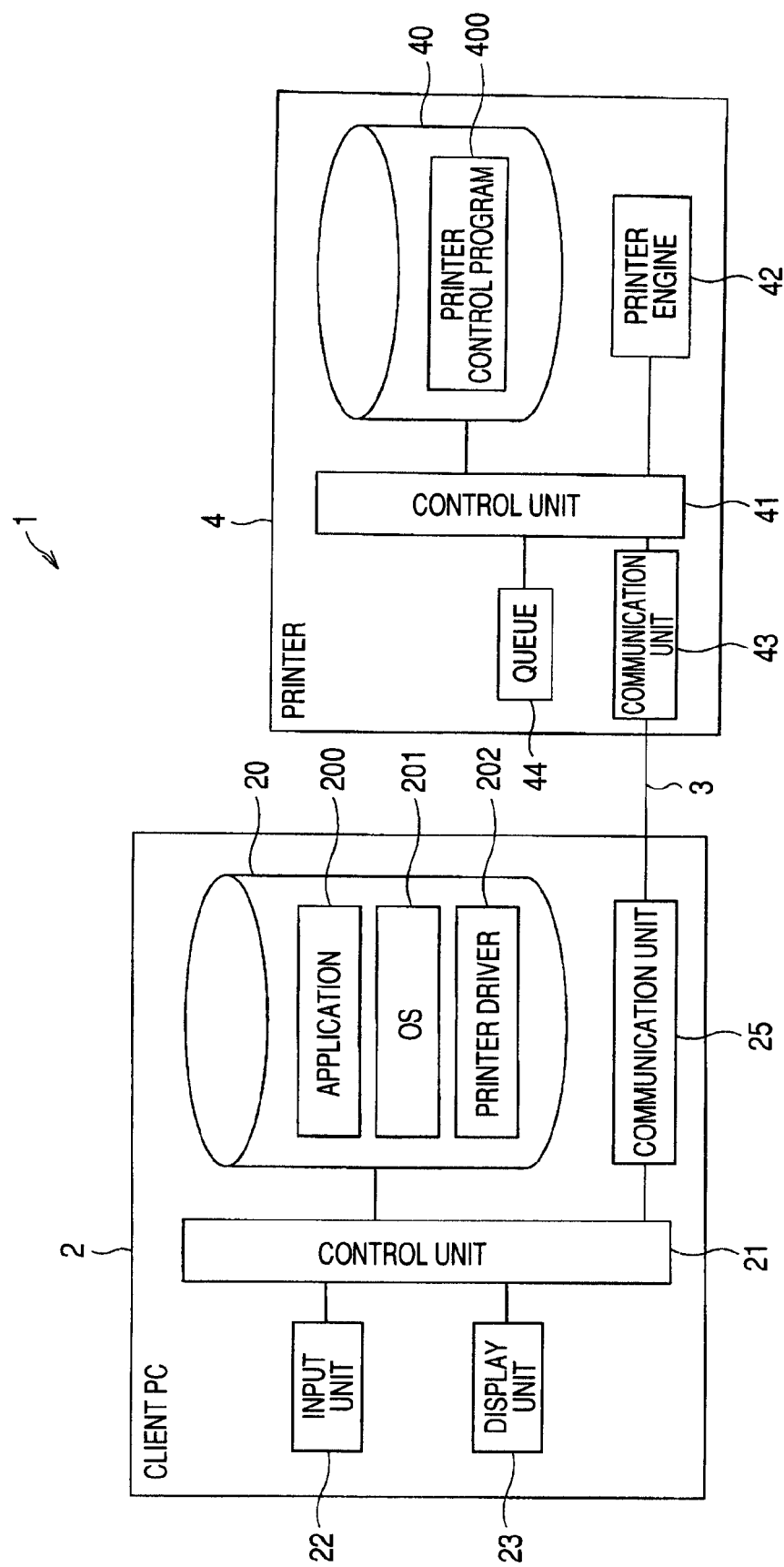
FIG. 5 is a block diagram illustrating an example printing system configuration according to a second exemplary embodiment of the present invention.

FIG. 5 is a block diagram illustrating an example printing system configuration according to a second exemplary embodiment of the present invention.

In the first exemplary embodiment, a printing control program and a queue have been provided for a client PC, while in the second exemplary embodiment, a printing control program and a queue are provided for a printer. The remainder of the configuration is the same as that for the first exemplary embodiment. For the second exemplary embodiment, a printing system 1 includes a client PC 2 and a printer 4 which serves as a printing control apparatus connected to the client PC 2 via a transmission medium 3.
(Client PC)

The client PC 2 of this exemplary embodiment, as well as of the first exemplary embodiment, includes: a storage unit 20, constituted, for example, by a ROM and an HDD (hard disk drive); a control unit 21, constituted, for example, by a CPU and a RAM; an input unit 22 that includes a keyboard and a mouse; a display unit 23, such as a liquid crystal display; and a communication unit 25, which is connected to the transmission medium 3. In this exemplary embodiment, the client PC 2 does not include a queue 24 for holding print jobs; however, a queue 24 may also be provided in the client PC 2. In such a case, the queue 24 is employed in the normal manner.

Programs, such as an application 200, an operating system (OS) 201 and a printer driver 202, are stored in the storage unit 20, but no printing control program 203 is stored.

The CPU of the control unit 21 reads a program from the storage unit 20 to the RAM and executes the program, to provide the program function.
(Printer)

The printer 4 of this exemplary embodiment, as well as of the first exemplary embodiment, includes: a storage unit 40, constituted, for example, by a ROM and an HDD (a hard disk drive); a control unit 41, constituted, for example, by a CPU and a RAM; a printer engine 42, which serves as printing unit for printing print data, received from the client PC 2, on a recording material such as a sheet of paper; a communication unit 43, which is connected to the transmission medium 3; and a queue 44, which is used for holding print jobs.

A program, such as a printer control program 400 that has the same function as the printing control program 203, is stored in the storage unit 40.

The CPU of the control unit 41 reads a program from the storage unit 40 to the RAM and executes the program, to provide the program function. Based on attribute information for a print job accepted via the communication unit 43, the control unit 41 determines whether the first printing instruction information has been set for the print job. When the first printing instruction information has been set, the print job is added to the queue 44, where it is held until an output instruction is issued. When the second printing instruction information has been set for the print job, the print job is temporarily added in the queue 44, and thereafter, this print job and the previously stored print job are output to the printer engine 42. When outputting these print jobs to the print engine 42, the control unit 41 translates print data for the print jobs and converts the print data into bit map data, and controls the print engine 42 to print the bit map data on a printing medium.

Operation Performed by the Second Exemplary Embodiment

An example operation performed by the printing system 1 of the second exemplary embodiment will now be described while referring to the flowchart in FIG. 6. For this description, the printing system 1 is employed to sequentially generate a print job A, a print job B and a print job C.

Assume here that a user, by manipulating the input unit 22 of the client PC 2, has created a document using the application 200 and has entered a printing instruction for the document. Thereafter, the application 200 transmits the document data, via the OS 201, to the printer driver 202, and the printer driver 202 displays the printing setup screen 100, illustrated in FIG. 2, on the display unit 23.

Then, on the printing setup screen 100, the user selects setup entry or entries 101*a* to 101*c* to determine a printing condition. In this case, assume that the user selects "print all later" using the button 102.

When the user has selected the printing condition, the printer driver 202 converts the document data into print data that the printer 4 can translate, and generates a print job A (the first print job) that includes, as the first printing instruction information, the print data, the printing condition and the attribute information. The print job A is thereafter transmitted to the printer 4 via the communication unit 25 and the transmission medium 3.

Upon receiving the print job A (S11), the control unit 41 of the printer 4 employs the attribute information of the print job A to determine whether the first printing instruction information ("print all later") has been set for the print job A (S12). When the first printing instruction information has been set for the print job A (Yes at S12), the print job A is added to the queue 44 and is held until an output instruction is issued (S13).

Next, assume that the user issued a printing instruction for a document prepared in the same manner, and prepared printing instruction information by selecting on the printing setup screen 100 whichever setup entry or entries 101*a* to 101*c* are desired, and selecting "print all later" using button 102. In this case, a print job B thus generated (a first print job) is added to the queue 44, and is held until an output instruction is issued.

Following this, assume that the user created another document, in the same manner, and issued a printing instruction for this document, and prepared printing condition information by selecting, on the printing setup screen 100, whichever setup entry or entries 101a to 101c are desired, but did not use the button 102 to select "print all later". In this case, the control unit 41 of the printer 4 employs the attribute information for the print job C (a second print job) to determine whether the first printing instruction information has been set for the print job C (S12). When the first printing instruction information has not been set (No at S12), the print job C is temporarily added to the queue 44, and thereafter, the print jobs A and B, previously added to the queue 44, and the print job C are extracted from the queue 44 in the named order. Furthermore, print data included in the print jobs A, B and C are translated and converted into bitmap data, and the obtained bitmap data are output to the printer engine 42 (S14).

Thereafter, the control unit 41 permits the printer engine 42 to use, in conformance with individually designated printing conditions, the bitmap data for the print jobs A, B and C to print on a recording material.

Third Exemplary Embodiment

FIG. 7 is a block diagram illustrating an example printing system configuration according to a third exemplary embodiment of the present invention.

In the third exemplary embodiment, a server is additionally provided for the first exemplary embodiment configuration, and a printer displays a list of print jobs.

A printing system 1 includes a client PC 2, a printer 4 and a server 6, which are interconnected by a network 5 that serves as transmission unit. Referring to FIG. 7, only one client PC 2 and one printer 4 are to be connected to the network 5; however, two or more of units may be employed for both, or either one, of the client PC 2 and printer 4.

The network 5, for example, is the Internet or a LAN (a Local Area Network), and both a wireless network and a wire network is available.

(Client PC)

As well as in the first exemplary embodiment, a client PC 2 includes a storage unit 20, a control unit 21, an input unit 22, a display unit 23, a queue 24 and a communication unit 25.

In the first exemplary embodiment, a print job that includes print data is stored in the queue 24. But in this exemplary embodiment, a print job that includes a printing condition, information for a storage location for document data and printing instruction information (attribute information) is stored in the queue 24.

Programs, such as an application 200, an operating system (OS) 201, a printer driver 202 and a printing control program 203, are stored in the storage unit 20.

The CPU of the control unit 21 reads a program from the storage unit 20 to the RAM and executes the program, to provide the program function.

The printer driver 202 generates a print job that includes a printing condition, information for a storage location for document data and printing instruction information (attribute information). When the printer driver 202 transmits a print job to the printer 4 in response to a request received from the printer 4, the printer driver 202 converts document data received from the server 6 into print data that the printer 4 can translate, and generates a print job that includes a printing condition, print data and printing instruction information.

The printing control program 203, as in the first exemplary embodiment, determines whether the first printing instruction information has been set up for the print job. When the first printing instruction information has been set up, the print job is stored in the queue 24, where it is held until an output instruction is issued. When the second printing instruction information has been set up for the print job, the print job is temporarily stored in the queue 24, and thereafter, this print job and the print job previously stored in the queue 24 are output by the communication unit 25, via the network 5, to the printer 4.

Furthermore, when the second printing instruction information indicating a print job has been received from the printer 4, the printing control program 203 transmits to the printer 4 the corresponding print job and the print job previously stored in the queue 24.

(Printer)

The printer 4 includes, as in the first exemplary embodiment, a storage unit 40, a control unit 41, a printer engine 42, a communication unit 43 and an operation display unit (display unit or selection unit) 45.

A touch panel, for example, is employed as the operation display unit 45. The operation display unit 45 may be constituted by an input unit and a display unit.

(Server)

The server 6 includes: a storage unit 60, constituted, for example, by a ROM and an HDD (a hard disk drive); a control unit 61, constituted, for example, by a CPU and a RAM; and a communication unit 62 connected to the network 5.

A program like a management program 600, IP address information 601 for a device like the printer 4 connected to the network 5, authentication information 602 and data, such as document data 603, are stored in the storage unit 60.

The CPU of the control unit 61 reads a program from the storage unit 60 to the RAM and executes the program, to provide the program function.

Operation of the Third Exemplary Embodiment

An example operation for the printing system 1 of the third exemplary embodiment will now be described while referring to a flowchart in FIG. 8. In this operation, plural print jobs are stored in the queue 24 of the client PC 2.

A user enters a user ID and a password by manipulating the operation display unit 45 of the printer 4, and logs in to the printing system 1 (S21). The control unit 41 of the printer 4 transmits to the server 6, via the communication unit 43 and the network 5, user information that includes the user ID and the password that were entered and IP address information, which are collectively used as identification information for identifying the printer 4.

Based on user information transmitted by the printer 4, the control unit 61 of the server 6 performs an authentication process, i.e., searches through authentication information 602 in the storage unit 60, and determines whether the user ID is available in the authentication information 602 and whether the password is matched (S22). When the user ID is found in the authentication information 602 and the password is matched, an authentication result, indicating that authentication has been successful, is transmitted to the printer 4 (S23). Then, a succeeding instruction issued to the printer 4 can be accepted.

Further, the control unit 61 of the server 6 compares the IP address information received from the printer 4 with the IP address information 601 stored in the storage unit 60, and when the IP address information matches, the printer 4 is identified as a component device of the printing system 1.

When authentication has been performed successfully, the printer 4 displays a "print at the same time" button (not shown) on the operation display unit 45. And when the user selects and clicks on the "print at the same time" button (S24), the control unit 41 of the printer 4 transmits a corresponding operation signal to the server 6 (S25).

The control unit 61 of the server 6 accesses the client PC 2 by transmitting the IP address information of the printer 4 and the user ID to the client PC 2. And then, the control unit 61 transmits an inquiry to determine whether a print job which is selected by the user who logged in to the printing system 1 via the printer 4 is stored in the queue 24 or not and whether the print job designates, as output destination, the printer 4 correlated with the IP address information or not (S26). Further, the control unit 61 obtains information, from the client PC 2, relating to the print job or jobs that (i) are selected the user, (ii) are stored in the queue 24, and (iii) designate the printer 4 correlated with the IP address information as the output destination (S27).

The control unit 61, of the server 6, transmits to the printer 4 information relating to the print job or jobs that (i) are selected by the user, (ii) are stored in the queue 24 and (iii) designate the printer 4 correlated with the IP address information as the output destination (S28).

The control unit 41 of the printer 4 thereafter creates a print job list by employing the information relating to the print job or jobs received from the server 6, and displays the list on the operation display unit 45 (S29).

The user selects a print job to be printed from the print job list displayed on the operation display unit 45 (S30). This user selected print job is the second print job.

The control unit 41, of the printer 4, transmits to the client PC 2 information relating to the print job (the second print job) selected by the user. The control unit 21 of the client PC 2 determines whether the print job (the first print job) is held in the queue 24. And when the print job (the first print job) is held in the queue 24, the storage location information of document data 603 for the second and the first print jobs is transmitted to the server 6 so as to request transmission of the document data.

Based on receiving the storage location information of the document data, the control unit 61 of the server 6 reads the corresponding document data 603 from the storage unit 60, and transmits it to the client PC 2. The client PC 2 converts the document data 603 received from the server 6 into print data that the printer 4 can translate, and transmits a print job including the print data, to the printer 4.

The control unit 41 of the printer 4 converts the print data included in the print job into bitmap data, and outputs the bitmap data to the printer engine 42. The printer engine 42 then uses the bitmap data to print, in conformance with a printing condition designated by a user, a recording material (S31).

The server 6 may convert document data into print data, and transmit the print data either to the client PC 2 or to the printer 4.

Fourth Exemplary Embodiment

FIGS. 9A and 9B are diagrams illustrating a fourth exemplary embodiment of the present invention. Specifically, FIG. 9A is a diagram showing an example print jobs, and FIG. 9B is a diagram showing printing results.

This exemplary embodiment differs from the first only in that a printing control program 203 is provided for a client PC 2, and since for both exemplary embodiments the remainder of the configuration is the same, a block diagram is not provided.

Assume that the same printing condition is employed for a print job A, a print job B and a print job C, e.g., that double-sided printing and the 2-UP mode are common, designated printing conditions, and that the print job A includes document data for three pages $A_1$, $A_2$ and $A_3$, the print job B includes document data for two pages $B_1$ and $B_2$ and the print job C includes document data for two pages $C_1$ and $C_2$. In this case, when the print jobs A, B and C are printed, in conformance with individually designated printing conditions, a blank space appears between the page $A_3$ and the page $B_1$.

According to the printing control program 203 of this exemplary embodiment, when the same printing condition is applicable to the printing of the print jobs A, B and C, data for document pages $A_1$, $A_2$, $A_3$, $B_1$, $B_2$, $C_1$, and $C_2$ are regarded as a single job, and as shown in FIG. 9B, to avoid the formation of a blank space between page $A_3$ and page $B_1$, a new print job is generated and printed.

When the applicable printing conditions for a first print job held in a queue are the same as those for a second print job, print target included in the first print job may be output to the printer 4, together with the second print job.

Fifth Exemplary Embodiment

Figure 10:
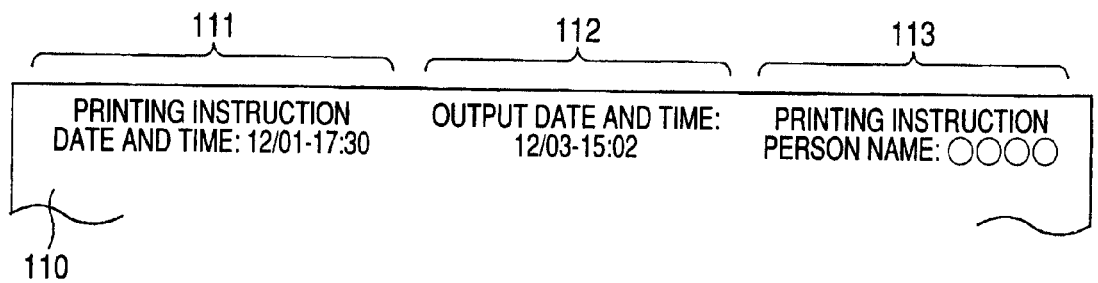
FIG. 10 is a diagram showing example printing results obtained for a fifth exemplary embodiment of the present invention.

FIG. 10 is a diagram illustrating printing results that are obtained from a fifth exemplary embodiment of the present invention.

Since the configuration for the fifth exemplary embodiment is essentially the same as the one for the first exemplary embodiment, with the exception that a printing control program 203 is provided for a client PC 2. So a block diagram for the configuration is not shown.

In this exemplary embodiment, the printing control program 203 prints on a printing medium 110, not only print target, but also information related to the time at which a user issued a printing instruction to an application 200, i.e., time information 111 having information relating to a month, a day of the week and an hour and minute, time information 112 having information relating to a date and a time output by the printer 4, and a name 113 of a person who issued the printing instruction. The information herein that is related to time may, for example, be information indicating a month, a day of the week, an hour, minutes and seconds, information indicating a month, a day of the week and an hour, or information indicating a month and a day of a week.

Sixth Exemplary Embodiment

Figure 11:
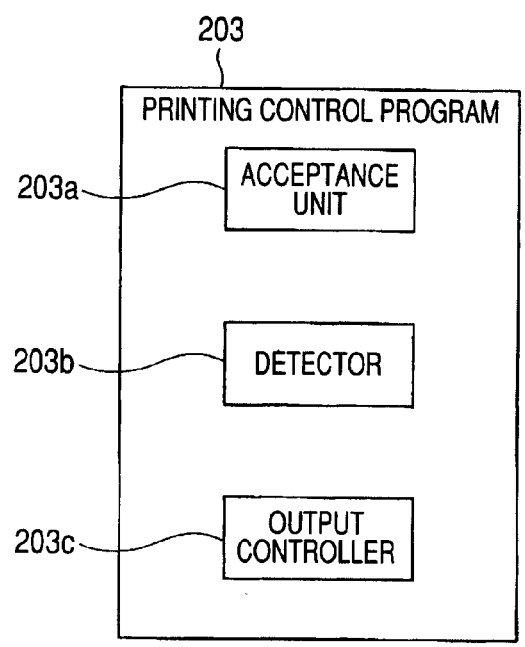
FIG. 11 is a block diagram illustrating an example printing system configuration according to a sixth exemplary embodiment of the present invention.

FIG. 11 is a diagram illustrating an example structure for a printing control program according to a sixth exemplary embodiment of the present invention. According to this exemplary embodiment, the function of a printing control program differs from that of the first exemplary embodiment. That is, a print job is added to a queue only when a predetermined printing instruction is issued; in other cases, a print job is output to a printer without being added to a queue.

A printing control program 203 in this exemplary embodiment includes: an acceptance unit 203a, which accepts a predetermined printing instruction to hold a print job in a queue 24 until an instruction to output the print job is issued; a detector 203b, which detects the output by a printer driver 202 of a print job to the printer 4, or which detects whether an instruction for the output of a print job to the printer 4 has been issued to the printer driver 202; and an output controller 203c, which adds to the queue 24 a corresponding print job when the acceptance unit 203a receives a predetermined printing instruction, or which permits the printer 4 to output a corresponding print job from the queue 24 when the detector 203b detects that an output instruction has been issued.

In this exemplary embodiment, the printer driver 202 generates and outputs a print job to the printer 4. When the acceptance unit 203a of the printing control program 203 has accepted a predetermined printing instruction, the output controller 203c stores in the queue 24 the print job output by the printer driver 202. And when the detector 203b detects that the print job has been output or that an output instruction has been issued, the output controller 203c permits the printer 4 to output the print job held in the queue 24.

An additional queue may be provided for holding print jobs for which predetermined printing instructions have not been issued.

Other Exemplary Embodiment

The present invention is not limited to the above described exemplary embodiments, and can be variously modified without departing from the subject of the invention.

A program employed for the individual exemplary embodiments may be read from a recording medium, such as a CD-ROM, and stored in a storage unit provided for a client PC, a printer or a server, or may be downloaded from a server connected to a network, such as the Internet, to the storage unit of a client PC, a printer or a server.

Part or all of the program may be provided using hardware, such as an ASIC (Application Specific IC).

In the first and second exemplary embodiments, the client PC 2 and the printer 4 have been connected by the transmission medium 3; however, the client PC 2 and the printer 4 may be connected via a network. In this case, a plurality of units may be employed for either one or both of the client PC 2 and the printer 4 for connection to the network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for controlling printing, the process comprising:
   accepting a first printing instruction that requests first document data to be printed by a printing apparatus;
   converting the first document data into first print data to be processed by the printing apparatus and storing in a queue of a storage unit a first print job that instructs the printing apparatus to process the first print data and print the processed first print data to a first recording medium, in response to accepting the first printing instruction;
   accepting a second printing instruction that requests second document data to be printed by the printing apparatus;
   converting the second document data into second print data to be processed by the printing apparatus and storing in the queue a second print job that instructs the printing apparatus to process the second print data and print the processed second print data to a second recording medium, in response to accepting the second printing instruction;
   detecting an attribute of the second print job that indicates to output all print jobs stored in the queue; and
   outputting, to the printing apparatus, in response to detecting the attribute of the second print job, both the second print job and the first print job stored in the queue.

2. The non-transitory computer readable medium according to claim 1, wherein the printing apparatus comprises a first printing apparatus and a second printing apparatus, and
   wherein the first print job specifies a first output destination as the first printing apparatus, the second print job specifies a second output destination as the second printing apparatus.

3. The non-transitory computer readable medium according to claim 1, wherein the first print job specifies a first print style, the second print job specifies a second print style, and the first print style is the same as the second print style.

4. The non-transitory computer readable medium according to claim 1, wherein the outputting to the printing apparatus comprises outputting control information to the printing apparatus, the control information causing the printing apparatus to print information related to a time at which the first printing instruction is accepted together with the first print data of the first print job.

5. A non-transitory computer readable medium storing a program causing a computer to execute a process for controlling printing, the process comprising:
   accepting a first printing instruction that requests first document data to be output;
   storing, in response to accepting the printing instruction, a first print job corresponding to the first printing instruction to a storage unit, the first print job instructing to output the first document data to a first recording medium;
   accepting a second printing instruction that requests second document data to be output, the second print instruction comprising printing instruction information that indicates to output the first document data and the second document data;
   detecting an attribute of the second print job that indicates to output all print jobs stored in the queue; and
   outputting, to the printing apparatus, in response to detecting the attribute of the second print job, both the second print job and the first print job stored in the queue.

6. The non-transitory computer readable medium according to claim 5, wherein the first print job stored in the storage unit specifies, as a designated destination, to output the first document data the printing apparatus and the second print instruction specifies to output the second document data to the printing apparatus.

7. The non-transitory computer readable medium according to claim 5, wherein, the first print job stored in the storage unit specifies a first print style, the second print instruction specifies a second print style, and the and the first print style is the same as the second print style.

8. The non-transitory computer readable medium according to claim 5, wherein the outputting to the printing apparatus comprises outputting control information to the printing apparatus, the control information causing the printing apparatus to print information related to a time at which the first printing instruction is detected together with the first print data of the first print job.

9. A printing control apparatus comprising:
   a first acceptance unit that accepts a first printing instruction that requests first document data to be printed by a printing apparatus and a second printing instruction that requests second document data to be printed by the printing apparatus;

a first storing unit that, in response to the first acceptance unit accepting the first printing instruction, converts the first document data into first print data to be processed by the printing apparatus and stores in a queue of the first storage unit a first print job that instructs the printing apparatus to process the first print data and print the processed first print data to a first recording medium, and in response to the first acceptance unit accepting the second printing instruction, converts the second document data into second print data to be processed by the printing apparatus and stores in the queue a second print job that instructs the printing apparatus to process the second print data and print the processed second print data to a second recording medium;

a detecting unit detects an attribute of the second print job that indicates to output all print jobs stored in the queue; and an output unit that, in response to the detecting unit detecting the attribute of the second print job, outputs to the printing apparatus the first print job and the second print job.

10. A printing system comprising:
the printing control apparatus according to claim 9, wherein the printing apparatus comprises:
 a second acceptance unit that accepts the second printing instruction;
 a first transmission unit that transmits the second printing instruction accepted by the second acceptance unit to the first acceptance unit; and
 a printing unit that performs the first print job and the second print job that are output by the output unit of the printing control apparatus.

11. The printing system according to claim 10, wherein the first print job comprises a plurality of print jobs, and
wherein the printing apparatus further comprises:
 a display unit that displays the plurality of print jobs stored in the first storage unit, and
 a selecting unit that selects one or more of the plurality of print jobs; and
wherein the second print job output by the output unit of the printing control apparatus is one of the plurality of print jobs selected by the selecting unit.

12. The printing system according to claim 10, further comprising:
a server apparatus,
wherein the first print job comprises storage location information for the first document data,
wherein the second print job includes storage location information for the second document data, and
wherein the server apparatus comprises:
 a second storage unit that stores both the first document data and the second document data; and
 a second transmission unit that transmits the first document data and the second document to the printing control apparatus or to the printing apparatus.

13. The printing system according to claim 12, wherein the printing apparatus further comprises an input unit into which user information is entered, and wherein the server apparatus further comprises:
 an authentication information storing unit that stores authentication information; and
 an authentication information processing unit that performs an authentication process by comparing user information, entered using the input unit, with the authentication information, and permits the second acceptance unit of the printing apparatus to accept the second printing instruction when the authentication process is successful.

14. The printing system according to claim 10, wherein the printing apparatus is one of a plurality of printing apparatuses that is connected to the printing control apparatus through each first transmission unit; and
 each transmission unit transmits the second printing instruction, with identification information indicating a corresponding printing apparatus, to the first acceptance unit, and
 the output unit of the printing control apparatus outputs the first print job and the second print job to the printing apparatus specified by identification information.

15. A print control apparatus comprising:
a memory that stores a print driver and a printing control program;
a processor that executes the printer driver and the printing control program stored in the memory,
wherein the printer driver executed by the processor causes the print control apparatus to receive a first printing instruction that instructs a printer to print first document data, convert the first document data into first print data to be printed by the printer, generate a first print job comprising the first print data and a first printing control instruction, the first printing control instruction indicating the printing control program to queue the first print job in a queue of the memory, transmit the first print job to the printing control program, receive a second printing instruction that instructs the printer to print second document data, convert the second document data into second print data to be printed by the printer, generate a second print job comprising the second print data and a second printing control instruction, the second printing control instruction indicating the printing control program to output all print jobs stored in the queue of the memory to the printer, and
wherein the printing control program executed by the processor causes the print control apparatus to receive the first print job from the printer driver, queue the first print job in a queue of the memory based on the first printing control instruction, receive the second print job from the printer driver, detect the second printing control instruction, and output the first print job in the queue of the memory and the second print job to the printer in response to detecting the second printing control instruction.

* * * * *